(12) United States Patent
Raghavan et al.

(10) Patent No.: US 7,686,732 B2
(45) Date of Patent: Mar. 30, 2010

(54) WIDE RATIO TRANSMISSIONS WITH MULTIPLE GEAR RATIOS

(75) Inventors: Madhusudan Raghavan, West Bloomfield, MI (US); Norman K. Bucknor, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 457 days.

(21) Appl. No.: 11/678,070

(22) Filed: Feb. 23, 2007

(65) Prior Publication Data

US 2008/0207380 A1 Aug. 28, 2008

(51) Int. Cl.
*F16H 3/62* (2006.01)

(52) U.S. Cl. .................. 475/278; 475/284; 475/330

(58) Field of Classification Search .......... 475/275, 475/277, 278, 284, 330
See application file for complete search history.

(56) References Cited

U.S. PATENT DOCUMENTS

| | | | |
|---|---|---|---|
| 6,375,592 B1 | 4/2002 | Takahashi et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,960,149 B2 * | 11/2005 | Ziemer | 475/276 |
| 2005/0272554 A1 * | 12/2005 | Raghavan et al. | 475/286 |

* cited by examiner

*Primary Examiner*—David D Le
(74) *Attorney, Agent, or Firm*—Quinn Law Group, PLLC

(57) ABSTRACT

The transmission has a plurality of members that can be utilized in powertrains to provide at least seven forward speed ratios and one reverse speed ratio. The transmission includes three planetary gear sets having seven torque-transmitting mechanisms and two fixed interconnections. The powertrain includes an engine and torque converter that is continuously connected to at least one of the planetary gear members and an output member that is continuously connected with another one of the planetary gear members. The seven torque-transmitting mechanisms provide interconnections between various gear members and with the transmission housing, and are operated in combinations of three to establish at least seven forward speed ratios and at least one reverse speed ratio.

12 Claims, 7 Drawing Sheets

(X = engaged clutch)

Sample Design: $\dfrac{N_{R_1}}{N_{S_1}} = 2.88,\quad \dfrac{N_{R_2}}{N_{S_2}} = 2.09,\quad \dfrac{N_{R_3}}{N_{S_3}} = 2.23$

|  | Ratios | 57 | 58 | 59 | 50 | 52 | 54 | 56 |
|---|---|---|---|---|---|---|---|---|
| Reverse | -2.88 | X |  |  | X |  | X |  |
| Neutral | 0.00 | X |  |  | X |  |  |  |
| 1 | 8.62 | X |  |  | X |  |  | X |
| 2 | 4.48 | XY |  | XY | X |  |  | Y |
| 3 | 3.09 | X |  |  |  |  | X | X |
| 4 | 2.92 |  | X | X |  |  | X |  |
| 5 | 2.91 |  |  | X | X |  |  | X |
| 6 | 1.90 |  |  | X | X |  | X |  |
| 7 | 1.54 |  | X |  |  |  | X | X |
| 8 | 1.45 |  |  | X |  | X | X |  |
| 9 | 1.00 |  |  |  |  | X | X | X |
| 10 | 0.90 |  | X |  |  | X |  | X |
| 11 | 0.74 |  | X |  |  | X | X |  |

| Ratio Spread | 11.62 |
|---|---|
| Ratio Steps |  |
| Rev/1 | -0.33 |
| 1/2 | 1.92 |
| 2/3 | 1.54 |
| 3/4 | 1.53 |
| 4/5 | 1.23 |
| 5/6 | 1.06 |
| 6/7 | 1.45 |
| 7/8 | 1.11 |
| 8/9 | 1.22 |

| Ratio Spread | 11.62 |
|---|---|
| Ratio Steps |  |
| Rev/1 | -0.33 |
| 1/2 | 1.92 |
| 2/3 | 1.54 |
| 3/4 | 1.53 |
| 4/5 | 1.31 |
| 5/6 | 1.45 |
| 6/7 | 1.11 |
| 7/8 | 1.22 |

| Ratio Spread | 11.62 |
|---|---|
| Ratio Steps |  |
| Rev/1 | -0.33 |
| 1/2 | 1.92 |
| 2/3 | 1.54 |
| 3/4 | 1.53 |
| 4/5 | 1.31 |
| 5/6 | 1.45 |
| 6/7 | 1.35 |

(X = engaged clutch)

Sample Design: $\dfrac{N_{R_1}}{N_{S_1}} = 3.00$, $\dfrac{N_{R_2}}{N_{S_2}} = 1.72$, $\dfrac{N_{R_3}}{N_{S_3}} = 2.58$

| | Ratios | 157 | 158 | 159 | 150 | 152 | 154 | 156 |
|---|---|---|---|---|---|---|---|---|
| Reverse | -3.00 | X | | | X | | X | |
| Neutral | 0.00 | X | | | X | | | |
| 1 | 5.80 | X | | | X | | | X |
| 2 | 3.77 | X | | X | | | | X |
| 3 | 2.71 | X | | | | | X | X |
| 4 | 2.64 | | | X | X | | | X |
| 5 | 2.48 | | X | X | | | X | |
| 6 | 1.74 | | | X | X | | X | |
| 7 | 1.43 | | X | | | | X | X |
| 8 | 1.39 | | | X | | X | X | |
| 9 | 1.00 | | | | | X | X | X |
| 10 | 0.91 | | X | | | X | | X |
| 11 | 0.75 | | X | | | X | X | |

| Ratio Spread | 7.73 |
|---|---|
| Ratio Steps | |
| Rev/1 | -0.52 |
| 1/2 | 1.54 |
| 2/3 | 1.43 |
| 3/4 | 1.51 |
| 4/5 | 1.25 |
| 5/6 | 1.39 |
| 6/7 | 1.09 |
| 7/8 | 1.22 |

| Ratio Spread | 7.73 |
|---|---|
| Ratio Steps | |
| Rev/1 | -0.52 |
| 1/2 | 1.54 |
| 2/3 | 1.43 |
| 3/4 | 1.51 |
| 4/5 | 1.25 |
| 5/6 | 1.39 |
| 6/7 | 1.22 |

(X = engaged clutch)

Sample Design: $\frac{N_{R_1}}{N_{S_1}} = 3.00$, $\frac{N_{R_2}}{N_{S_2}} = 2.40$, $\frac{N_{R_3}}{N_{S_3}} = 3.00$

|  | Ratios | 257 | 258 | 259 | 250 | 252 | 254 | 256 |
|---|---|---|---|---|---|---|---|---|
| Reverse | -3.00 | X |  |  | X |  | X |  |
| Neutral | 0.00 | X |  |  | X |  |  |  |
| 1 | 7.26 | X |  |  | X |  |  | X |
| 2 | 4.53 | XY | X | Y | Y |  |  | X |
| 3 | 3.40 | X |  |  |  |  | X | X |
| 4 | 2.83 |  |  | X | X |  |  | X |
| 5 | 2.73 |  | X | X |  |  | X |  |
| 6 | 1.70 |  |  | X | X |  | X |  |
| 7 | 1.59 |  | X |  |  |  | X | X |
| 8 | 1.33 |  |  | X |  | X | X |  |
| 9 | 1.00 |  |  |  | X | X | X |  |
| 10 | 0.92 |  | X |  | X |  | X |  |
| 11 | 0.75 |  | X |  |  | X | X |  |

| Ratio Spread | 9.68 |
|---|---|
| Ratio Steps |  |
| Rev/1 | -0.41 |
| 1/2 | 1.6 |
| 2/3 | 1.33 |
| 3/4 | 1.25 |
| 4/5 | 1.6 |
| 5/6 | 1.28 |
| 6/7 | 1.33 |
| 7/8 | 1.08 |
| 8/9 | 1.23 |

| Ratio Spread | 9.68 |
|---|---|
| Ratio Steps |  |
| Rev/1 | -0.41 |
| 1/2 | 1.6 |
| 2/3 | 1.6 |
| 3/4 | 1.66 |
| 4/5 | 1.27 |
| 5/6 | 1.33 |
| 6/7 | 1.08 |
| 7/8 | 1.23 |

| Ratio Spread | 9.68 |
|---|---|
| Ratio Steps |  |
| Rev/1 | -0.41 |
| 1/2 | 1.6 |
| 2/3 | 1.6 |
| 3/4 | 1.66 |
| 4/5 | 1.27 |
| 5/6 | 1.33 |
| 6/7 | 1.33 |

(X = engaged clutch)

Sample Design: $\frac{N_{R_1}}{N_{S_1}} = 3.00$, $\frac{N_{R_2}}{N_{S_2}} = 2.72$, $\frac{N_{R_3}}{N_{S_3}} = 2.58$

|  | Ratios | 357 | 358 | 359 | 350 | 352 | 354 | 356 |
|---|---|---|---|---|---|---|---|---|
| Reverse | -3.00 | X |  |  | X |  | X |  |
| Neutral | 0.00 | X |  |  | X |  |  |  |
| 1 | 5.80 | X |  |  | X |  |  | X |
| 2 | 3.77 | X |  | X |  |  |  | X |
| 3 | 2.71 | X |  |  |  |  | X | X |
| 4 | 2.64 |  |  | X | X |  |  | X |
| 5 | 2.48 |  | X | X |  |  | X |  |
| 6 | 1.74 |  |  | X | X |  | X |  |
| 7 | 1.43 | X |  |  |  |  | X | X |
| 8 | 1.39 |  |  | X |  | X | X |  |
| 9 | 1.00 |  |  |  |  | X | X | X |
| 10 | 0.91 |  | X |  | X |  |  | X |
| 11 | 0.75 |  | X |  |  | X | X |  |

| Ratio Spread | 7.73 |
|---|---|
| Ratio Steps |  |
| Rev/1 | -0.52 |
| 1/2 | 1.54 |
| 2/3 | 1.43 |
| 3/4 | 1.51 |
| 4/5 | 1.25 |
| 5/6 | 1.39 |
| 6/7 | 1.09 |
| 7/8 | 1.22 |

| Ratio Spread | 7.73 |
|---|---|
| Ratio Steps |  |
| Rev/1 | -0.52 |
| 1/2 | 1.54 |
| 2/3 | 1.43 |
| 3/4 | 1.51 |
| 4/5 | 1.25 |
| 5/6 | 1.39 |
| 6/7 | 1.22 |

(X = engaged clutch)

Sample Design: $\dfrac{N_{R_1}}{N_{S_1}} = 2.88,\quad \dfrac{N_{R_2}}{N_{S_2}} = 2.09,\quad \dfrac{N_{R_3}}{N_{S_3}} = 2.23$

|  | Ratios | 457 | 458 | 459 | 450 | 452 | 454 | 456 |
|---|---|---|---|---|---|---|---|---|
| Reverse | -2.88 | X |  |  | X |  | X |  |
| Neutral | 0.00 | X |  |  |  |  | X |  |
| 1 | 4.48 | X |  | X |  |  | X |  |
| 2 | 3.09 | X |  |  |  |  | X | X |
| 3 | 2.92 |  | X | X |  |  | X |  |
| 4 | 2.23 |  | X | X |  |  |  | X |
| 5 | 1.90 |  |  | X | X |  | X |  |
| 6 | 1.54 |  | X |  |  |  | X | X |
| 7 | 1.45 |  |  | X |  | X | X |  |
| 8 | 1.00 |  |  |  |  | X | X | X |
| 9 | 0.74 |  | X |  |  | X | X |  |

| Ratio Spread | 6.05 |
|---|---|
| Ratio Steps |  |
| Rev/1 | -0.64 |
| 1/2 | 1.53 |
| 2/3 | 1.31 |
| 3/4 | 1.45 |
| 4/5 | 1.06 |
| 5/6 | 1.45 |
| 6/7 | 1.35 |

| Ratio Spread | 6.05 |
|---|---|
| Ratio Steps |  |
| Rev/1 | -0.64 |
| 1/2 | 1.53 |
| 2/3 | 1.31 |
| 3/4 | 1.17 |
| 4/5 | 1.23 |
| 5/6 | 1.06 |
| 6/7 | 1.45 |
| 7/8 | 1.35 |

(X = engaged clutch)

Sample Design: $\frac{N_{R_1}}{N_{S_1}} = 3.00,\quad \frac{N_{R_2}}{N_{S_2}} = 3.00,\quad \frac{N_{R_3}}{N_{S_3}} = 2.58$

| | Ratios | 557 | 558 | 559 | 550 | 552 | 554 | 556 |
|---|---|---|---|---|---|---|---|---|
| Reverse | -3.00 | X | | | X | | X | |
| Neutral | 0.00 | X | | | | | X | |
| 1 | 5.55 | X | | X | | | X | |
| 2 | 4.00 | X | | | | | X | X |
| 3 | 3.30 | | X | X | | | X | |
| 4 | 2.43 | | X | X | | | | X |
| 5 | 1.89 | | | X | X | | X | |
| 6 | 1.75 | | X | | | | X | X |
| 7 | 1.39 | | | X | | X | X | |
| 8 | 1.00 | | | | | X | X | X |
| 9 | 0.75 | | X | | | | X | X |

| Ratio Spread | 7.40 |
|---|---|
| Ratio Steps | |
| Rev/1 | -0.54 |
| 1/2 | 1.68 |
| 2/3 | 1.36 |
| 3/4 | 1.39 |
| 4/5 | 1.26 |
| 5/6 | 1.39 |
| 6/7 | 1.33 |

| Ratio Spread | 7.40 |
|---|---|
| Ratio Steps | |
| Rev/1 | -0.54 |
| 1/2 | 1.68 |
| 2/3 | 1.36 |
| 3/4 | 1.29 |
| 4/5 | 1.08 |
| 5/6 | 1.26 |
| 6/7 | 1.39 |
| 7/8 | 1.33 |

(X = engaged clutch)

Sample Design: $\dfrac{N_{R_1}}{N_{S_1}} = 2.88$, $\dfrac{N_{R_2}}{N_{S_2}} = 3.09$, $\dfrac{N_{R_3}}{N_{S_3}} = 2.23$

|  | Ratios | 657 | 658 | 659 | 650 | 652 | 654 | 656 |
|---|---|---|---|---|---|---|---|---|
| Reverse | -2.88 | X |  |  | X |  | X |  |
| Neutral | 0.00 | X |  |  |  |  | X |  |
| 1 | 4.48 | X |  | X |  |  | X |  |
| 2 | 3.09 | X |  |  |  |  | X | X |
| 3 | 2.92 |  | X | X |  |  | X |  |
| 4 | 2.23 |  | X | X |  |  |  | X |
| 5 | 1.90 |  |  | X | X |  | X |  |
| 6 | 1.54 |  | X |  |  |  | X | X |
| 7 | 1.45 |  |  | X |  | X | X |  |
| 8 | 1.00 |  |  |  |  | X | X | X |
| 9 | 0.74 |  | X |  |  | X | X |  |

| Ratio Spread | 6.05 |
|---|---|
| Ratio Steps |  |
| Rev/1 | -0.64 |
| 1/2 | 1.53 |
| 2/3 | 1.31 |
| 3/4 | 1.45 |
| 4/5 | 1.06 |
| 5/6 | 1.45 |
| 6/7 | 1.35 |

| Ratio Spread | 6.05 |
|---|---|
| Ratio Steps |  |
| Rev/1 | -0.64 |
| 1/2 | 1.53 |
| 2/3 | 1.31 |
| 3/4 | 1.17 |
| 4/5 | 1.23 |
| 5/6 | 1.06 |
| 6/7 | 1.45 |
| 7/8 | 1.35 |

WIDE RATIO TRANSMISSIONS WITH MULTIPLE GEAR RATIOS

TECHNICAL FIELD

The present invention relates to a family of power transmissions having three planetary gear sets that are controlled by seven torque-transmitting devices to provide at least seven forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having three planetary gear sets controlled to provide at least seven forward speed ratios and one reverse speed ratio.

The electrically variable transmission family of the present invention has three planetary gear sets, each of which includes a first, second and third member, which members may comprise a sun gear, a ring gear, or a planet carrier assembly member, in any order.

In referring to the first, second and third gear sets in this description and in the claims, these sets may be counted "first" to "third" in any order in the drawings (i.e., left to right, right to left, etc.). Additionally, the first, second or third members of each gear set may be counted "first" to "third" in any order in the drawings (i.e., top to bottom, bottom to top, etc.) for each gear set.

Each carrier member can be either a single-pinion carrier member (simple) or a double-pinion carrier member (compound).

A first interconnecting member continuously connects the first member of the first planetary gear set with the first member of the second planetary gear set.

A second interconnecting member continuously connects the second member of the second planetary gear set with the first member of the third planetary gear set.

The input member is continuously connected with at least one member of the planetary gear sets. The output member is continuously connected with at least one member of the planetary gear sets.

A first torque transmitting device, such a clutch, selectively connects a member of the first planetary gear set with a member of the first, second or third planetary gear set which is continuously connected with the input member.

A second torque transmitting device, such as a clutch, selectively connects the first interconnecting member with a member of the first, second or third planetary gear set which is continuously connected with the input member.

A third torque transmitting device, such as a clutch, selectively connects a member of the first planetary gear set with a member of the first, second or third planetary gear set which is continuously connected with the output member.

A fourth torque transmitting device, such as a clutch, selectively connects a member of the first planetary gear set with a member of the third planetary gear set or with the second interconnecting member.

A fifth torque transmitting device, such as a brake, selectively connects the first interconnecting member with a stationary member (transmission housing/casing).

A sixth torque transmitting device, such as a brake, selectively connects a member of the first planetary gear set with a stationary member (transmission housing/casing).

A seventh torque transmitting device, such as a brake, selectively connects a member of the third planetary gear set with a stationary member (transmission housing/casing).

The seven torque-transmitting mechanisms are selectively engageable in combinations of three to yield at least seven forward speed ratios and at least one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission in accordance with the present invention;

FIG. 1b is a truth table and chart depicting some of the operating characteristics of the powertrain shown in FIG. 1a;

FIG. 2a is a schematic representation of a powertrain including a planetary transmission incorporating another family member of the present invention;

FIG. 2b is an operating mode table and fixed ratio mode table depicting some of the operating characteristics of the powertrain shown in FIG. 2a;

FIG. 3a is a schematic representation of a powertrain including a planetary transmission incorporating another family member of the present invention;

FIG. 3b is an operating mode table and fixed ratio mode table depicting some of the operating characteristics of the powertrain shown in FIG. 3a;

FIG. 4a is a schematic representation of a powertrain including a planetary transmission incorporating another family member of the present invention;

FIG. 4b is an operating mode table and fixed ratio mode table depicting some of the operating characteristics of the powertrain shown in FIG. 4a;

FIG. 5a is a schematic representation of a powertrain including a planetary transmission incorporating another family member of the present invention;

FIG. 5b is an operating mode table and fixed ratio mode table depicting some of the operating characteristics of the powertrain shown in FIG. 5a;

FIG. 6a is a schematic representation of a powertrain including a planetary transmission incorporating another family member of the present invention;

FIG. 6b is an operating mode table and fixed ratio mode table depicting some of the operating characteristics of the powertrain shown in FIG. 6a;

FIG. 7a is a schematic representation of a including a planetary transmission incorporating another family member of the present invention; and FIG. 7b is an operating mode table and fixed ratio mode table depicting some of the operating characteristics of the powertrain shown in FIG. 7a.

DESCRIPTION OF THE PREFERRED EMBODIMENTS

Figures 1A, 1B:
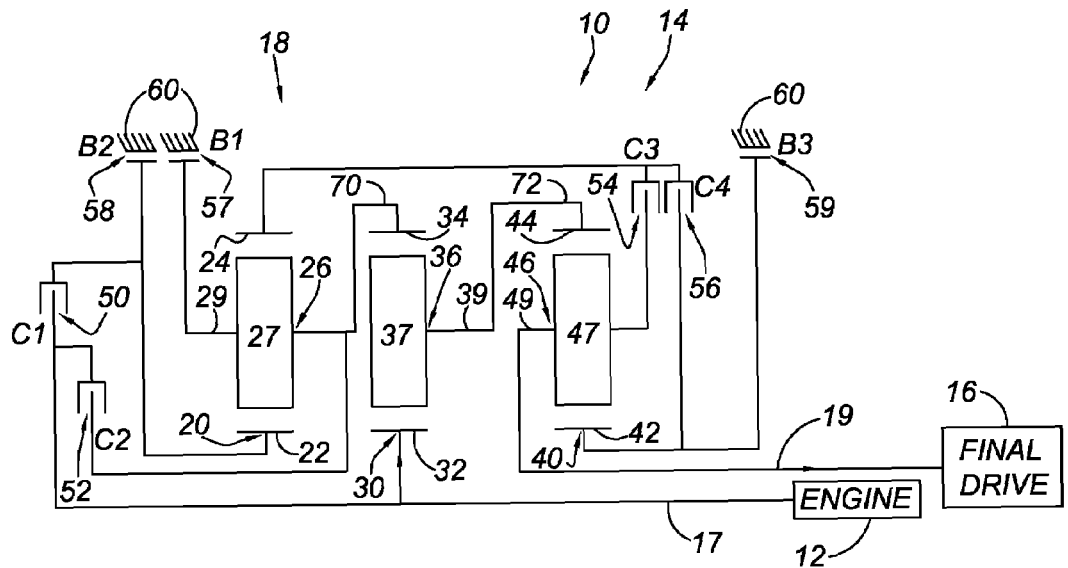

Referring to the drawings, there is shown in FIG. 1a a powertrain 10 having a conventional engine and torque converter 12, a planetary transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 14 includes an input member 17 continuously connected with the engine 12, a planetary gear arrangement 18, and an output member 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the ring gear member 34 and the sun gear member 32.

The planetary gear set 40 includes a sun gear member 42, a ring gear member 44, and a planet carrier assembly member 46. The planet carrier assembly member 46 includes a plurality of pinion gears 47 mounted on a carrier member 49 and disposed in meshing relationship with both the ring gear member 44 and the sun gear member 42.

The planetary gear arrangement also includes seven torque-transmitting mechanisms 50, 52, 54, 56, 57, 58 and 59.

The torque-transmitting mechanisms 50, 52, 54 and 56 are rotating-type torque-transmitting mechanisms, commonly termed clutches. The torque-transmitting mechanisms 57, 58 and 59 are stationary-type torque-transmitting mechanisms, commonly termed brakes or reaction clutches.

The input member 17 is continuously connected to the sun gear member 32 of the planetary gear set 30. The output member 19 is continuously connected with the carrier member 46 of the planetary gear set 40. The first interconnecting member 70 continuously connects the carrier member 26 of the planetary gear set 20 with the ring gear member 34 of the planetary gear set 30. A second interconnecting member 72 continuously connects the carrier member 36 of the planetary gear set 30 with the ring gear member 44 of the planetary gear set 40.

A first torque transmitting device, such as clutch 50, selectively connects the sun gear member 22 of the planetary gear set 20 with the sun gear member 32 of the planetary gear set 30 which is continuously connected with the input member 17. A second torque transmitting device, such as clutch 52, selectively connects the carrier member 26 of the planetary gear set 20 and the ring gear member 34 of the planetary gear set 30 via the first interconnecting member 70 with the sun gear member 32 of the planetary gear set 30 which is continuously connected with the input member 17. A third torque transmitting device, such as clutch 54, selectively connects the ring gear member 24 of the planetary gear set 20 with the carrier member 46 of the planetary gear set 40 which is continuously connected with the output member 19. A fourth torque transmitting device, such as clutch 56, selectively connects the ring gear member 24 of the planetary gear set 20 with the sun gear member 42 of the planetary gear set 40. A fifth torque transmitting device, such as brake 57, selectively connects the carrier member 26 of the planetary gear set 20 and the ring gear member 34 of the planetary gear set 30 via first interconnecting member 70 with the transmission housing 60. A sixth torque transmitting device, such as brake 58, selectively connects the sun gear member 22 of the planetary gear set 20 with the transmission housing 60. A seventh torque transmitting device, such as brake 59, selectively connects the sun gear member 42 of the planetary gear set 40 with the transmission housing 60.

As shown in FIG. 1b, and in particular the truth table disclosed therein, the torque-transmitting mechanisms are selectively engaged in combinations of three to provide at least seven forward speed ratios and one reverse speed ratio.

The reverse (Reverse) speed ratio is established with the engagement of the clutches 50, 54 and brake 57. The clutch 50 selectively connects the sun gear member 22 with the sun gear member 32 which is continuously connected with the input member 17. The clutch 54 selectively connects the ring gear member 24 with the carrier member 46 which is continuously connected with the output member 19. The brake 57 selectively connects the carrier member 26 and ring gear member 34 via interconnecting member 70 with the transmission housing 60. The sun gear member 22, sun gear member 32 and the input member 17 rotate at the same speed. The carrier member 36 and the ring gear member 44 rotate at the same speed. The carrier member 26 and ring gear member 34 do not rotate. The speed of the carrier member 36 is determined from the speed of the sun gear member 32 and the ring gear/sun gear tooth ratio of the planetary gear set 30. The ring gear member 24, carrier member 46 and output member 19 rotate at the same speed. The speed of the ring gear member 24, and therefore the output member 19, is determined from the speed of the sun gear member 22 and the ring gear/sun gear tooth ratio of the planetary gear set 20. The numerical value of the reverse speed ratio is determined utilizing the ring gear/sun gear tooth ratios of the planetary gear sets 20 and 30.

The first forward speed ratio is established with the engagement of the clutches 50, 56 and brake 57. The clutch 50 selectively connects the sun gear member 22 with the sun gear member 32 which is continuously connected with the input member 17. The clutch 56 selectively connects the ring gear member 24 with the sun gear member 42. The brake 57 selectively connects the carrier member 26 and the ring gear member 34 via interconnecting member 70 with the transmission housing 60. The carrier member 26 and ring gear member 34 do not rotate. The sun gear member 22 and sun gear member 32 rotate at the same speed as the input member 17. The ring gear member 24 and sun gear member 42 rotate at the same speed. The speed of the ring gear member 24 is determined from the speed of the sun gear member 22 and the ring gear/sun gear tooth ratio of the planetary gear set 20. The carrier member 36 and ring gear member 44 rotate at the same speed. The speed of the carrier member 36 is determined from the speed of the sun gear member 32 and the ring gear/sun gear tooth ratio of the planetary gear set 30. The carrier member 46 and output member 19 rotate at the same speed. The speed of the carrier member 46, and therefore the output member 19, is determined from the speed of the sun gear member 42, the speed of the ring gear member 44 and the ring gear/sun gear tooth ratio of the planetary gear set 40. The numerical value of the first forward speed ratio is determined utilizing the ring gear/sun gear tooth ratios of the planetary gear sets 20, 30 and 40.

The second forward speed ratio is established with the engagement of the clutch 50 and brakes 57 and 59. The clutch 50 selectively connects the sun gear member 22 with the sun gear member 32 which is continuously connected with the input member 17. The brake 57 selectively connects the carrier member 26 and the ring gear member 34 via interconnecting member 70 with the transmission housing 60. The brake 59 selectively connects the sun gear member 42 with the transmission housing 60. The carrier member 26 and ring gear member 34 do not rotate. The sun gear member 22 and sun gear member 32 rotate at the same speed as the input member 17. The carrier member 36 and ring gear member 44 rotate at the same speed. The speed of the carrier member 36 is determined from the speed of the sun gear member 32 and the ring gear/sun gear tooth ratio of the planetary gear set 30. The sun gear member 42 does not rotate. The carrier member 46 and output member 19 rotate at the same speed. The speed of the carrier member 46, and therefore the output member 19, is determined from the speed of the ring gear member 44 and the ring gear/sun gear tooth ratio of the planetary gear set 40. The numerical value of the second forward speed ratio is determined utilizing the ring gear/sun gear tooth ratios of the planetary gear sets 30 and 40.

An alternative second forward speed ratio is established with the engagement of the clutch 56 and the brakes 57 and 59, as indicated by the "Y"s in FIG. 1b. The clutch 56 selectively engages the ring gear member 24 with the sun gear member 42. The brake 57 selectively connects the carrier member 26 and the ring gear member 34 via interconnecting member 70 with the transmission housing 60. The brake 59 selectively connects the sun gear member 42 with the transmission housing 60. The carrier member 26 and ring gear member 34 do not rotate. The ring gear member 24 and the sun gear member 42 do not rotate. The sun gear member 32 rotates at the same speed as the input member 17. The carrier member 36 and ring gear member 44 rotate at the same speed. The carrier member 36 rotates at a speed determined from the speed of the sun gear member 32 and the ring gear/sun gear tooth ratio of the planetary gear set 30. The carrier member 46 and the output member 19 rotate at the same speed. The speed of the carrier member 46, and therefore the output member 19, is determined from the speed of the ring gear member 44 and the ring gear/sun gear tooth ratio of the planetary gear set 40. The numerical value of the alternative second forward speed ratio is determined utilizing the ring gear/sun gear tooth ratios of the planetary gear sets 30 and 40.

The third forward speed ratio is established with the engagement of the clutches 54, 56 and brake 57. The clutch 54 selectively engages the ring gear member 24 with the carrier member 46. The clutch 56 selectively engages the ring gear member 24 with the sun gear member 42. The brake 57 selectively connects the carrier member 26 and ring gear member 34 via interconnecting member 70 with the transmission housing 60. The carrier member 26 and ring gear member 34 do not rotate. The ring gear member 24, carrier member 36, planetary gear set 40 and output member 19 rotate at the same speed. As is understood by those skilled in the art, if any two members of a planetary gear set rotate at the same speed, i.e. sun gear member 42 and carrier member 46 via connection to ring gear member 24 via clutches 54 and 56, then the entire planetary gear set rotates at the same speed. The sun gear member 32 rotates at the same speed as the input member 17. The carrier member 36, and therefore the output member 19, rotates at a speed determined from the speed of the sun gear member 32 and the ring gear/sun gear tooth ratio of the planetary gear set 30. The numerical value of the third forward speed ratio is determined utilizing the ring gear/sun gear tooth ratios of the planetary gear set 30.

The fourth forward speed ratio is established with the engagement of the clutch 54 and the brakes 58 and 59. The clutch 54 selectively engages the ring gear member 24 with the carrier member 46 which is continuously connected with the output member 19. The brake 58 selectively connects the sun gear member 22 with the transmission housing 60. The brake 59 selectively connects the sun gear member 42 with the transmission housing 60. The sun gear member 22 does not rotate. The ring gear member 24, carrier member 46 and output member 19 rotate at the same speed. The carrier member 26 and ring gear member 34 rotate at the same speed. The carrier member 26 rotates at a speed determined from the speed of the ring gear member 24 and the ring gear/sun gear tooth ratio of the planetary gear set 20. The sun gear member 32 rotates at the same speed as the input member 17. The carrier member 36 and ring gear member 44 rotate at the same speed. The speed of the carrier member 36 is determined from the speed of the sun gear member 32, the speed of the ring gear member 34 and the ring gear/sun gear tooth ratio of the planetary gear set 30. The sun gear member 42 does not rotate. The carrier member 46, and therefore the output member 19, rotates at a speed determined from the speed of the ring gear member 44 and the ring gear/sun gear tooth ratio of the planetary gear set 40. The numerical value of the fourth forward speed ratio is determined utilizing the ring gear/sun gear tooth ratio of the planetary gear sets 20, 30 and 40.

The fifth forward speed ratio is established with the engagement of the clutches 50, 56 and brake 59. The clutch 50 selectively engages sun gear member 22 with the sun gear member 32. The clutch 56 selectively engages the ring gear member 24 with the sun gear member 42. The brake 59 selectively connects the sun gear member 42 with the transmission housing 60. The sun gear member 22 and sun gear member 32 rotate at the same speed as the input member 17. The ring gear member 24 and sun gear member 42 do not rotate. The carrier member 26 and ring gear member 34 rotate at the same speed. The carrier member 26 rotates at a speed determined from the speed of the sun gear member 22 and the ring gear/sun gear tooth ratio of the planetary gear set 20. The carrier member 36 and ring gear member 44 rotate at the same speed. The speed of the carrier member 36 is determined from the speed of the sun gear member 32, the speed of the ring gear member 34 and the ring gear/sun gear tooth ratio of the planetary gear set 30. The carrier member 46 and output member 19 rotate at the same speed. The carrier member 46, and therefore the output member 19, rotates at a speed determined from the speed of the ring gear member 44 and the ring gear/sun gear tooth ratio of the planetary gear set 40. The numerical value of the fifth forward speed ratio is determined utilizing the ring gear/sun gear tooth ratio of the planetary gear sets 20, 30 and 40.

The sixth forward speed ratio is established with the engagement of the clutches 50, 54 and brake 59. The clutch 50 selectively engages the sun gear member 22 with the sun gear member 32 which is continuously connected with the input member 17. The clutch 54 selectively engages the ring gear member 24 with the carrier member 46 which is continuously connected with the output member 19. The brake 59 selectively connects the sun gear member 42 with the transmission housing 60. The sun gear member 22 and sun gear member 32 rotate at the same speed as the input member 17. The ring gear member 24 and carrier member 46 rotates at the same speed as the output member 19. The carrier member 26 rotates at the same speed as the ring gear member 34. The carter member 26 rotates at a speed determined from the speed of the sun gear member 22, the speed of the ring gear member 24 and the ring gear/sun gear tooth ratio of the planetary gear set 20. The carrier member 36 and ring gear member 44 rotate at the same speed. The carrier member 36 rotates at a speed determined from the speed of the sun gear member 32, the speed of the ring gear member 34 and the ring gear/sun gear tooth ratio of the planetary gear set 30. The sun gear member 42 does not rotate. The speed of the carrier member 46, and therefore the output member 19, is determined from the speed of the ring gear member 44 and the ring gear/sun gear tooth ratio of the planetary gear set 40. The numerical value of the sixth forward speed ratio is determined utilizing the ring gear/sun gear tooth ratios of the planetary gear sets 20, 30 and 40.

The seventh forward speed ratio is established with the engagement of the clutches 54, 56 and brake 58. The clutch 54 selectively engages the ring gear member 24 with the carrier member 46 which is continuously connected with the output member 19. The clutch 56 selectively engages the ring gear member 24 with the sun gear member 42. The brake 58 selectively connects the sun gear member 22 with the transmission housing 60. The sun gear member 22 does not rotate. The ring gear member 24, planetary gear set 40 and carrier member 36 rotate at the same speed as the output member 19. The carrier member 26 and ring gear member 34 rotate at the same speed. The carrier member 26 rotates at a speed determined from the speed of the ring gear member 24 and the ring gear/sun gear tooth ratio of the planetary gear set 20. The sun gear member 32 rotates at the same speed as the input member 17. The carrier member 36 and therefore the output member 19, rotates at a speed determined from the speed of the sun gear member 32, the speed of the ring gear member 34 and the ring gear/sun gear tooth ratio of the planetary gear set 30. The numerical value of the seventh forward speed ratio is determined utilizing the ring gear/sun gear tooth ratios of the planetary gear sets 20 and 30.

The eighth forward speed ratio is established with the engagement of the clutches 52, 54 and brake 59. The clutch 52 selectively connects the carrier member 26 with the sun gear member 32 which is continuously connected with the input member 17. The clutch 54 selectively connects the ring gear member 24 with the carrier member 46 which is connected with the output member 19. The brake 59 selectively connects the sun gear member 42 with the transmission housing 60. The carrier member 26, ring gear member 44 and the planetary gear set 30 rotate at the same speed as the input member 17. The ring gear member 24 and carrier member 46 rotate at the same speed as the output member 19. The carrier member 46, and therefore the output member 19, rotates at a speed determined from the speed of the ring gear member 44 and the ring gear/sun gear tooth ratio of the planetary gear set 40. The numerical value of the eighth forward speed ratio is determined utilizing the ring gear/sun gear tooth ratio of the planetary gear set 40.

The ninth forward speed ratio is established with the engagement of the clutches 52, 54 and 56. In this configuration, the input member 17 is directly connected with the output member 19. The numerical value of the ninth forward speed ratio is 1.

The tenth forward speed ratio is established with the engagement of the clutches 52, 56 and brake 58. The clutch 52 selectively connects the carrier member 26 with the sun gear member 32 which is continuously connected with the input member 17. The clutch 56 selectively connects the ring gear member 24 with the sun gear member 42. The brake 58 selectively connects the sun gear member 22 with the transmission housing 60. The sun gear member 22 does not rotate. The carrier member 26, planetary gear set 30 and ring gear member 44 rotate at the same speed as the input member 17. The ring gear member 24 and sun gear member 42 rotate at the same speed. The ring gear member 24 rotates at a speed determined from the speed of the carrier member 26 and the ring gear/sun gear tooth ratio of the planetary gear set 20. The carrier member 46 and output member 19 rotate at the same speed. The carrier member 46, and therefore the output member 19, rotates at a speed determined from the speed of the sun gear member 42, the speed of the ring gear member 44 and the ring gear/sun gear tooth ratio of the planetary gear set 40. The numerical value of the tenth forward speed ratio is determined utilizing the ring gear/sun gear tooth ratio of the planetary gear sets 20 and 40.

The eleventh forward speed ratio is established with the engagement of the clutches 52, 54 and brake 58. The clutch 52 selectively connects the carrier member 26 with the sun gear member 32 which is continuously connected with the input member 17. The clutch 54 selectively connects the ring gear member 24 with the carrier member 46 which is continuously connected with the output member 19. The brake 58 selectively connects the sun gear member 22 with the transmission housing 60. The sun gear member 22 does not rotate. The carrier member 26, planetary gear set 30 and ring gear member 44 rotate at the same speed as the input member 17. The ring gear member 24, carrier member 46 and output member 19 rotate at the same speed. The ring gear member 24, and therefore the output member 19, rotates at a speed determined from the speed of the carrier member 26 and the ring gear/sun gear tooth ratio of the planetary gear set 20. The numerical value of the eleventh forward speed ratio is determined utilizing the ring gear/sun gear tooth ratio of the planetary gear set 20.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The $N_{R1}/S_{R1}$ value is the tooth ratio of the planetary gear set 20; the $N_{R2}/S_{R2}$ value is the tooth ratio of the planetary gear set 30; and the $N_{R3}/S_{R3}$ value is the tooth ratio of the planetary gear set 40. Also, the chart of FIG. 1*b* describes the ratio steps that are attained utilizing the sample of tooth ratios given, for possible 9-speed, 8-speed and 7-speed engagement schedules of the above described transmission. For example, the step ratio between the first and second forward speed ratios is 1.92, while the step ratio between the reverse speed ratio (Reverse) and first forward ratio is −0.33 for each.

The 9-speed has 2 double transition shifts, while the 8- and 7-speed have all single transition shifts.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

Description of A Second Exemplary Embodiment

Figures 2A, 2B:
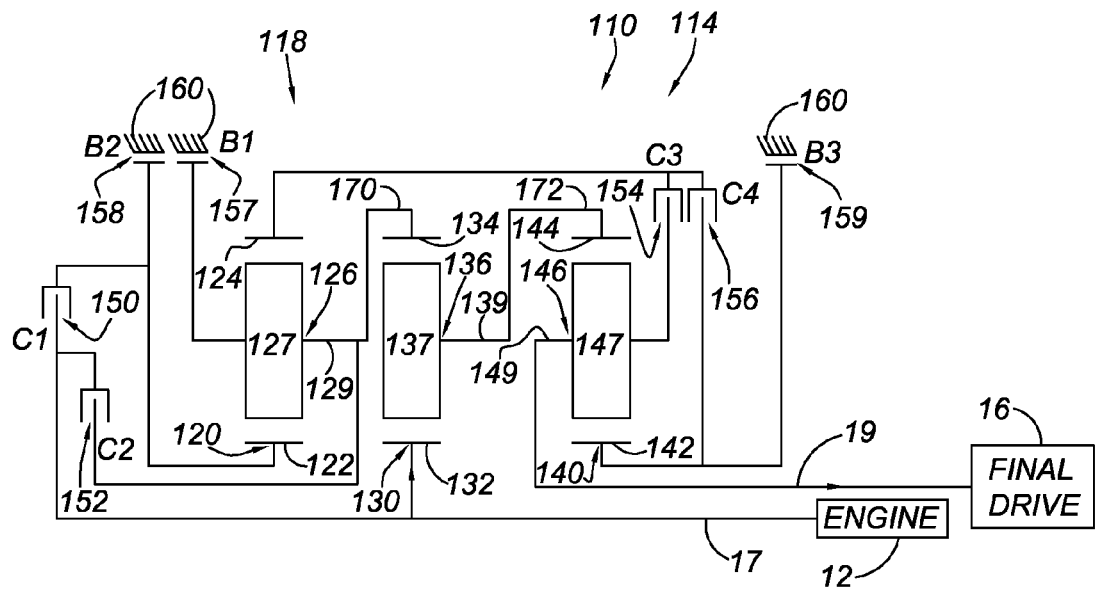

With reference to FIG. 2*a*, a powertrain 110 is shown, including a conventional engine and torque converter 12 connected to another embodiment of the planetary transmission, designated generally by the numeral 114, and a conventional final drive mechanism 16.

The planetary transmission 114 includes an input member 17 continuously connected with the engine 112, a planetary gear arrangement 118, and an output member 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the ring gear member 134 and the sun gear member 132.

The planetary gear set 140 includes a sun gear member 142, a ring gear member 144, and a planet carrier assembly member 146. The planet carrier assembly member 146 includes a plurality of pinion gears 147 mounted on a carrier member 149 and disposed in meshing relationship with both the ring gear member 144 and the sun gear member 142.

The planetary gear arrangement also includes seven torque-transmitting mechanisms 150, 152, 154, 156, 157, 158 and 159. The torque-transmitting mechanisms 150, 152, 154 and 156 are rotating-type torque-transmitting mechanisms, commonly termed clutches. The torque-transmitting mechanisms 157, 158 and 159 are stationary-type torque-transmitting mechanisms, commonly termed brakes or reaction clutches.

The input member 17 is continuously connected to the sun gear member 132 of the planetary gear set 130. The output member 19 is continuously connected with the carrier member 146 of the planetary gear set 140. The first interconnecting member 170 continuously connects the carrier member 126 of the planetary gear set 120 with the ring gear member 134 of the planetary gear set 130. A second interconnecting member 172 continuously connects the carrier member 136 of the planetary gear set 130 with the ring gear member 144 of the planetary gear set 140.

A first torque transmitting device, such as clutch 150, selectively connects the sun gear member 122 of the planetary gear set 120 with the sun gear member 132 of the planetary gear set 130 which is continuously connected with the input member 17. A second torque transmitting device, such as clutch 152, selectively connects the carrier member 126 of the planetary gear set 120 and the ring gear member 134 of the planetary gear set 130 via the first interconnecting member 170 with the sun gear member 132 of the planetary gear set 130 which is continuously connected with the input member 17. A third torque transmitting device, such as clutch 154, selectively connects the ring gear member 124 of the planetary gear set 120 with the carrier member 146 of the planetary gear set 140 which is continuously connected with the output member 19. A fourth torque transmitting device, such as clutch 156, selectively connects the ring gear member 124 of the planetary gear set 120 with the sun gear member 142 of the planetary gear set 140. A fifth torque transmitting device, such as brake 157, selectively connects the carrier member 126 of the planetary gear set 120 and the ring gear member 134 of the planetary gear set 130 via first interconnecting member 170 with the transmission housing 160. A sixth torque transmitting device, such as brake 158, selectively connects the sun gear member 122 of the planetary gear set 120 with the transmission housing 160. A seventh torque transmitting device, such as brake 159, selectively connects the sun gear member 142 of the planetary gear set 140 with the transmission housing 160.

The truth tables given in FIGS. 2*b*, 3*b*, 4*b*, 5*b*, 6*b* and 7*b* show the engagement sequences for the torque-transmitting mechanisms to provide at least seven forward speed ratios and at least one reverse ratio. As shown and described above for the configuration in FIG. 1*a*, those skilled in the art will understand from the respective truth tables how the speed ratios are established through the planetary gear sets identified in the written description.

As set forth above, the truth table of FIG. 2*b* describes the engagement sequence of the torque-transmitting mechanisms utilized to provide one reverse drive ratio and at least seven forward speed ratios. The truth table also provides an example of the ratios that can be attained with the family members shown in FIG. 2*a* utilizing the sample tooth ratios given in FIG. 2*b*. The $N_{R1}/N_{S1}$ value is the tooth ratio of the planetary gear set 120; the $N_{R2}/N_{S2}$ value is the tooth ratio of the planetary gear set 130; and the $N_{R3}/NS_3$ value is the tooth ratio of the planetary gear set 140. Also shown in FIG. 2*b* are the ratio steps between single step ratios in the forward direction as well as the reverse to first ratio step ratio for 7-speed and 8-speed engagement schedules. For example, the first to second step ratio is 1.54.

Description of A Third Exemplary Embodiment

With reference to FIG. 3a, a powertrain 210 is shown, including a conventional engine and torque converter 12 connected to another embodiment of the planetary transmission, designated generally by the numeral 214, and a conventional final drive mechanism 16.

The planetary transmission 214 includes an input member 17 continuously connected with the engine 212, a planetary gear arrangement 218, and an output member 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the ring gear member 234 and the sun gear member 232.

The planetary gear set 240 includes a sun gear member 242, a ring gear member 144, and a planet carrier assembly member 246. The planet carrier assembly member 246 includes a plurality of pinion gears 247 mounted on a carrier member 249 and disposed in meshing relationship with both the ring gear member 244 and the sun gear member 242.

The planetary gear arrangement also includes seven torque-transmitting mechanisms 250, 252, 254, 256, 257, 258 and 259. The torque-transmitting mechanisms 250, 252, 254 and 256 are rotating-type torque-transmitting mechanisms, commonly termed clutches. The torque-transmitting mechanisms 257, 258 and 259 are stationary-type torque-transmitting mechanisms, commonly termed brakes or reaction clutches.

The input member 17 is continuously connected to the sun gear member 232 of the planetary gear set 230. The output member 19 is continuously connected with the carrier member 246 of the planetary gear set 240. The first interconnecting member 270 continuously connects the carrier member 226 of the planetary gear set 220 with the ring gear member 234 of the planetary gear set 230. A second interconnecting member 272 continuously connects the carrier member 236 of the planetary gear set 230 with the ring gear member 244 of the planetary gear set 240.

A first torque transmitting device, such as clutch 250, selectively connects the sun gear member 222 of the planetary gear set 220 with the sun gear member 232 of the planetary gear set 230 which is continuously connected with the input member 17. A second torque transmitting device, such as clutch 252, selectively connects the carrier member 226 of the planetary gear set 220 and the ring gear member 234 of the planetary gear set 230 via the first interconnecting member 270 with the sun gear member 232 of the planetary gear set 230 which is continuously connected with the input member 17. A third torque transmitting device, such as clutch 254, selectively connects the ring gear member 224 of the planetary gear set 220 with the carrier member 246 of the planetary gear set 240 which is continuously connected with the output member 19. A fourth torque transmitting device, such as clutch 256, selectively connects the ring gear member 224 of the planetary gear set 220 with the sun gear member 242 of the planetary gear set 240. A fifth torque transmitting device, such as brake 257, selectively connects the carrier member 226 of the planetary gear set 220 and the ring gear member 234 of the planetary gear set 230 via first interconnecting member 270 with the transmission housing 260. A sixth torque transmitting device, such as brake 258, selectively connects the sun gear member 222 of the planetary gear set 220 with the transmission housing 260. A seventh torque transmitting device, such as brake 259, selectively connects the sun gear member 242 of the planetary gear set 240 with the transmission housing 260.

Figure 3B:
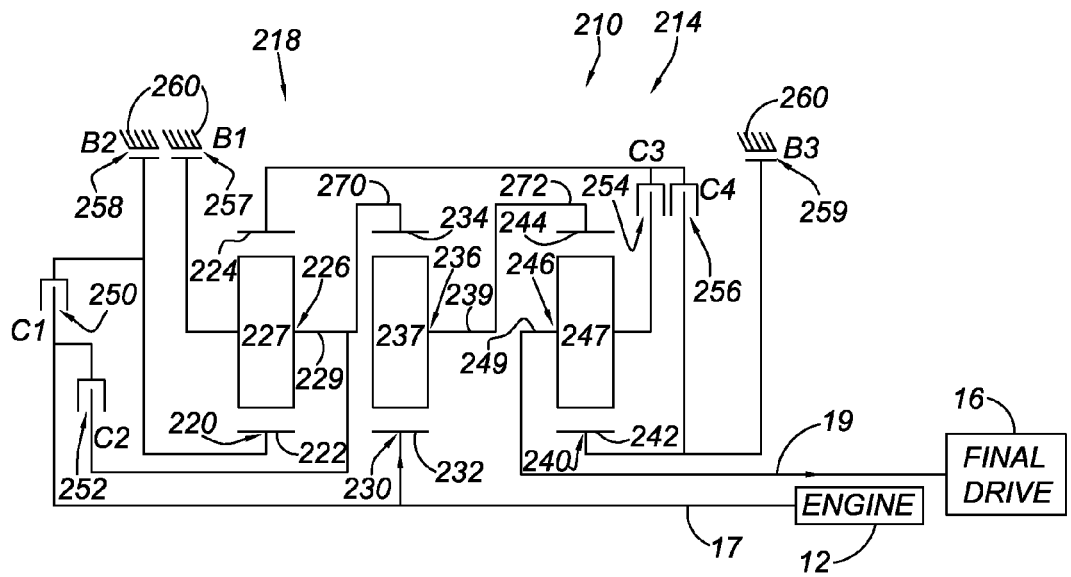

As set forth above, the truth table of FIG. 3b describes the engagement sequence of the torque-transmitting mechanisms utilized to provide one reverse drive ratio and at least seven forward speed ratios. The truth table also provides an example of the ratios that can be attained with the family members shown in FIG. 3a utilizing the sample tooth ratios given in FIG. 3b. The $N_{R1}/N_{S1}$ value is the tooth ratio of the planetary gear set 220; the $N_{R2}/N_{S2}$ value is the tooth ratio of the planetary gear set 230; and the $N_{R3}/N_{S3}$ value is the tooth ratio of the planetary gear set 240. Also shown in FIG. 3b are the ratio steps between single step ratios in the forward direction as well as the reverse to first ratio step ratio for 7-speed, 8-speed and 9-speed engagement schedules. For example, the first to second step ratio is 1.60.

Description of A Fourth Exemplary Embodiment

Figures 4A, 4B:
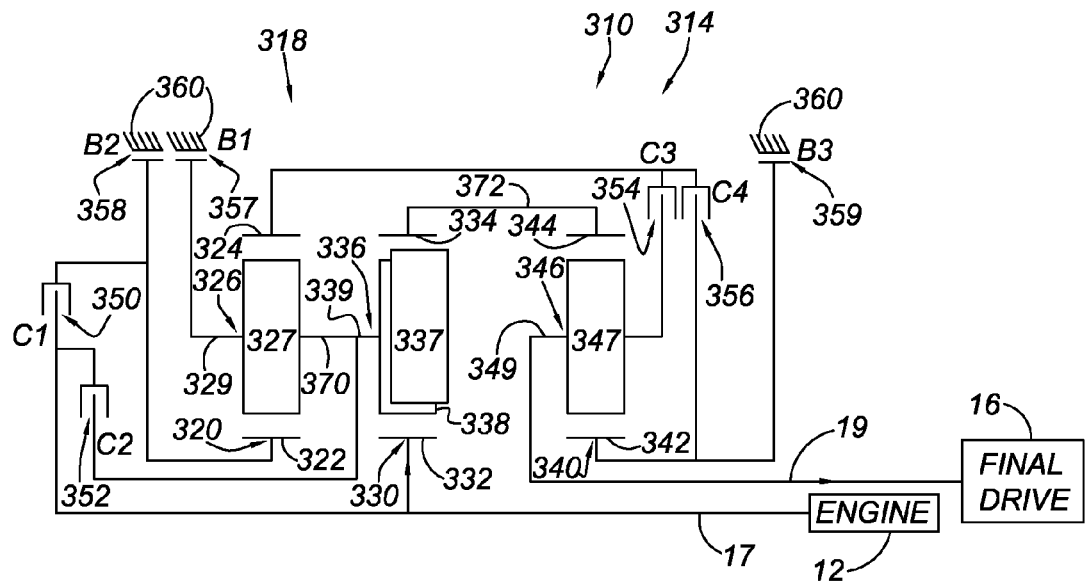

With reference to FIG. 4a, a powertrain 310 is shown, including a conventional engine and torque converter 12 connected to another embodiment of the planetary transmission, designated generally by the numeral 314, and a conventional final drive mechanism 16.

The planetary transmission 314 includes an input member 17 continuously connected with the engine 312, a planetary gear arrangement 318, and an output member 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 229 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337, 338 rotatably mounted on a carrier member 339. The pinion gears 337 are disposed in meshing relationship with the ring gear member 334 and the pinion gears 338 are disposed in meshing relationship with both the sun gear member 332 and the respective pinion gear 337.

The planetary gear set 340 includes a sun gear member 342, a ring gear member 344, and a planet carrier assembly member 346. The planet carrier assembly member 346 includes a plurality of pinion gears 347 mounted on a carrier member 349 and disposed in meshing relationship with both the ring gear member 344 and the sun gear member 342.

The planetary gear arrangement also includes seven torque-transmitting mechanisms 350, 352, 354, 356, 357, 358 and 359. The torque-transmitting mechanisms 350, 352, 354 and 356 are rotating-type torque-transmitting mechanisms, commonly termed clutches. The torque-transmitting mechanisms 357, 358 and 359 are stationary-type torque-transmitting mechanisms, commonly termed brakes or reaction clutches.

The input member 17 is continuously connected to the sun gear member 332 of the planetary gear set 330. The output member 19 is continuously connected with the carrier member 346 of the planetary gear set 340. The first interconnecting member 370 continuously connects the carrier member 326 of the planetary gear set 320 with the carrier member 336 of the planetary gear set 330. A second interconnecting member 372 continuously connects the ring gear member 334 of the planetary gear set 330 with the ring gear member 344 of the planetary gear set 340.

A first torque transmitting device, such as clutch 350, selectively connects the sun gear member 322 of the planetary gear set 320 with the sun gear member 332 of the planetary gear set 330 which is continuously connected with the input member 17. A second torque transmitting device, such as clutch 352, selectively connects the carrier member 326 of the planetary gear set 320 and the ring gear member 334 of the planetary gear set 330 via the first interconnecting member 370 with the sun gear member 332 of the planetary gear set 330 which is continuously connected with the input member 17. A third torque transmitting device, such as clutch 354, selectively connects the ring gear member 324 of the planetary gear set 320 with the carrier member 346 of the planetary gear set 340 which is continuously connected with the output member 19. A fourth torque transmitting device, such as clutch 356, selectively connects the ring gear member 324 of the planetary gear set 320 with the sun gear member 342 of the planetary gear set 340. A fifth torque transmitting device, such as brake 357, selectively connects the carrier member 326 of the planetary gear set 320 and the carrier member 336 of the planetary gear set 330 via first interconnecting member 370 with the transmission housing 360. A sixth torque transmitting device, such as brake 358, selectively connects the sun gear member 322 of the planetary gear set 320 with the transmission housing 360. A seventh torque transmitting device, such as brake 359, selectively connects the sun gear member 342 of the planetary gear set 340 with the transmission housing 360.

As set forth above, the truth table of FIG. 4b describes the engagement sequence of the torque-transmitting mechanisms utilized to provide one reverse drive ratio and at least seven forward speed ratios. The truth table also provides an example of the ratios that can be attained with the family members shown in FIG. 4a utilizing the sample tooth ratios given in FIG. 4b. The $N_{R1}/N_{S1}$ value is the tooth ratio of the planetary gear set 320; the $N_{R2}/N_{S2}$ value is the tooth ratio of the planetary gear set 330; and the $N_{R3}/N_{S3}$ value is the tooth ratio of the planetary gear set 340. Also shown in FIG. 4b are the ratio steps between single step ratios in the forward direction as well as the reverse to first ratio step ratio for 7-speed and 8-speed engagement schedules. For example, the first to second step ratio is 1.54.

Description of A Fifth Exemplary Embodiment

Figures 5A, 5B:
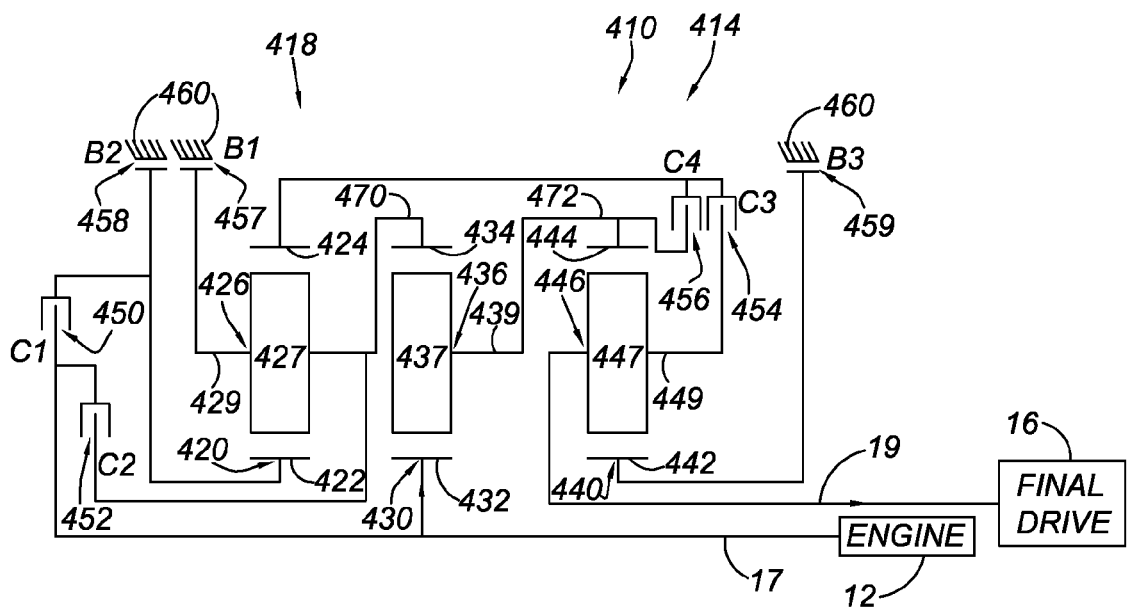

With reference to FIG. 5a, a powertrain 410 is shown, including a conventional engine and torque converter 12 connected to another embodiment of the planetary transmission, designated generally by the numeral 414, and a conventional final drive mechanism 16.

The planetary transmission 414 includes an input member 17 continuously connected with the engine 412, a planetary gear arrangement 418, and an output member 19 continuously connected with the final drive mechanism 16. The planetary gear arrangement 418 includes three planetary gear sets 420, 430 and 440.

The planetary gear set 420 includes a sun gear member 422, a ring gear member 424, and a planet carrier assembly member 426. The planet carrier assembly member 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the ring gear member 434 and the sun gear member 432.

The planetary gear set 440 includes a sun gear member 442, a ring gear member 444, and a planet carrier assembly member 446. The planet carrier assembly member 446 includes a plurality of pinion gears 447 mounted on a carrier member 449 and disposed in meshing relationship with both the ring gear member 444 and the sun gear member 442.

The planetary gear arrangement also includes seven torque-transmitting mechanisms 450, 452, 454, 456, 457, 458 and 459. The torque-transmitting mechanisms 450, 452, 454 and 456 are rotating-type torque-transmitting mechanisms, commonly termed clutches. The torque-transmitting mechanisms 457, 458 and 459 are stationary-type torque-transmitting mechanisms, commonly termed brakes or reaction clutches.

The input member 17 is continuously connected to the sun gear member 432 of the planetary gear set 430. The output member 19 is continuously connected with the carrier member 446 of the planetary gear set 440. The first interconnecting member 470 continuously connects the carrier member 426 of the planetary gear set 420 with the ring gear member 434 of the planetary gear set 430. A second interconnecting member 472 continuously connects the carrier member 436 of the planetary gear set 430 with the ring gear member 444 of the planetary gear set 440.

A first torque transmitting device, such as clutch 450, selectively connects the sun gear member 422 of the planetary gear set 420 with the sun gear member 432 of the planetary gear set 430 which is continuously connected with the input member 17, A second torque transmitting device, such as clutch 452, selectively connects the carrier member 426 of the planetary gear set 420 and the ring gear member 434 of the planetary gear set 430 via the first interconnecting member 470 with the sun gear member 432 of the planetary gear set 430 which is continuously connected with the input member 17. A third torque transmitting device, such as clutch 454, selectively connects the ring gear member 424 of the planetary gear set 420 with the carrier member 446 of the planetary gear set 440 which is continuously connected with the output member 19. A fourth torque transmitting device, such as clutch 456, selectively connects the ring gear member 424 of the planetary gear set 420 with the ring gear member 444 of the planetary gear set 440. A fifth torque transmitting device, such as brake 457, selectively connects the carrier member 426 of the planetary gear set 420 and the ring gear member 434 of the planetary gear set 430 via first interconnecting member 470 with the transmission housing 460. A sixth torque transmitting device, such as brake 458, selectively connects the sun gear member 422 of the planetary gear set 420 with the transmission housing 460. A seventh torque transmitting device, such as brake 459, selectively connects the sun gear member 442 of the planetary gear set 440 with the transmission housing 460.

As set forth above, the truth table of FIG. 5b describes the engagement sequence of the torque-transmitting mechanisms utilized to provide one reverse drive ratio and at least seven forward speed ratios. The truth table also provides an example of the ratios that can be attained with the family members shown in FIG. 5a utilizing the sample tooth ratios given in FIG. 5b. The $N_{R1}/N_{S1}$, value is the tooth ratio of the planetary gear set 420; the $N_{R2}/N_{S2}$ value is the tooth ratio of the planetary gear set 430; and the $N_{R3}/N_{S3}$ value is the tooth ratio of the planetary gear set 440. Also shown in FIG. 5b are the ratio steps between single step ratios in the forward direction as well as the reverse to first ratio step ratio for 7-speed and 8-speed engagement schedules. For example, the first to second step ratio is 1.53.

Description of A Sixth Exemplary Embodiment

With reference to FIG. 6a, a powertrain 510 is shown, including a conventional engine and torque converter 12 connected to another embodiment of the planetary transmission, designated generally by the numeral 514, and a conventional final drive mechanism 16.

The planetary transmission 514 includes an input member 17 continuously connected with the engine 512, a planetary gear arrangement 518, and an output member 19 continuously connected with the final drive mechanism 16. The planetary gear arrangement 518 includes three planetary gear sets 520, 530 and 540.

The planetary gear set 520 includes a sun gear member 522, a ring gear member 524, and a planet carrier assembly member 526. The planet carrier assembly member 5226 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the ring gear member 534 and the sun gear member 532.

The planetary gear set 540 includes a sun gear member 542, a ring gear member 544, and a planet carrier assembly member 546. The planet carrier assembly member 546 includes a plurality of pinion gears 547 mounted on a carrier member 549 and disposed in meshing relationship with both the ring gear member 544 and the sun gear member 542.

The planetary gear arrangement also includes seven torque-transmitting mechanisms 550, 552, 554, 556, 557, 558 and 559. The torque-transmitting mechanisms 550, 552, 554 and 556 are rotating-type torque-transmitting mechanisms, commonly termed clutches. The torque-transmitting mechanisms 557, 558 and 559 are stationary-type torque-transmitting mechanisms, commonly termed brakes or reaction clutches.

The input member 17 is continuously connected to the sun gear member 532 of the planetary gear set 530. The output member 19 is continuously connected with the carrier member 546 of the planetary gear set 540. The first interconnecting member 570 continuously connects the carrier member 526 of the planetary gear set 520 with the ring gear member 534 of the planetary gear set 530. A second interconnecting member 572 continuously connects the carrier member 536 of the planetary gear set 530 with the ring gear member 544 of the planetary gear set 540.

A first torque transmitting device, such as clutch 550, selectively connects the sun gear member 522 of the planetary gear set 520 with the sun gear member 532 of the planetary gear set 530 which is continuously connected with the input member 17. A second torque transmitting device, such as clutch 552, selectively connects the carrier member 526 of the planetary gear set 520 and the ring gear member 534 of the planetary gear set 530 via the first interconnecting member 570 with the sun gear member 532 of the planetary gear set 530 which is continuously connected with the input member 17. A third torque transmitting device, such as clutch 554, selectively connects the ring gear member 524 of the planetary gear set 520 with the carrier member 546 of the planetary gear set 540 which is continuously connected with the output member 19. A fourth torque transmitting device, such as clutch 556, selectively connects the ring gear member 524 of the planetary gear set 520 with the ring gear member 544 of the planetary gear set 540. A fifth torque transmitting device, such as brake 557, selectively connects the carrier member 526 of the planetary gear set 520 and the ring gear member 534 of the planetary gear set 530 via first interconnecting member 570 with the transmission housing 560. A sixth torque transmitting device, such as brake 558, selectively connects the sun gear member 522 of the planetary gear set 520 with the transmission housing 560. A seventh torque transmitting device, such as brake 559, selectively connects the sun gear member 542 of the planetary gear set 540 with the transmission housing 560.

Figure 6B:
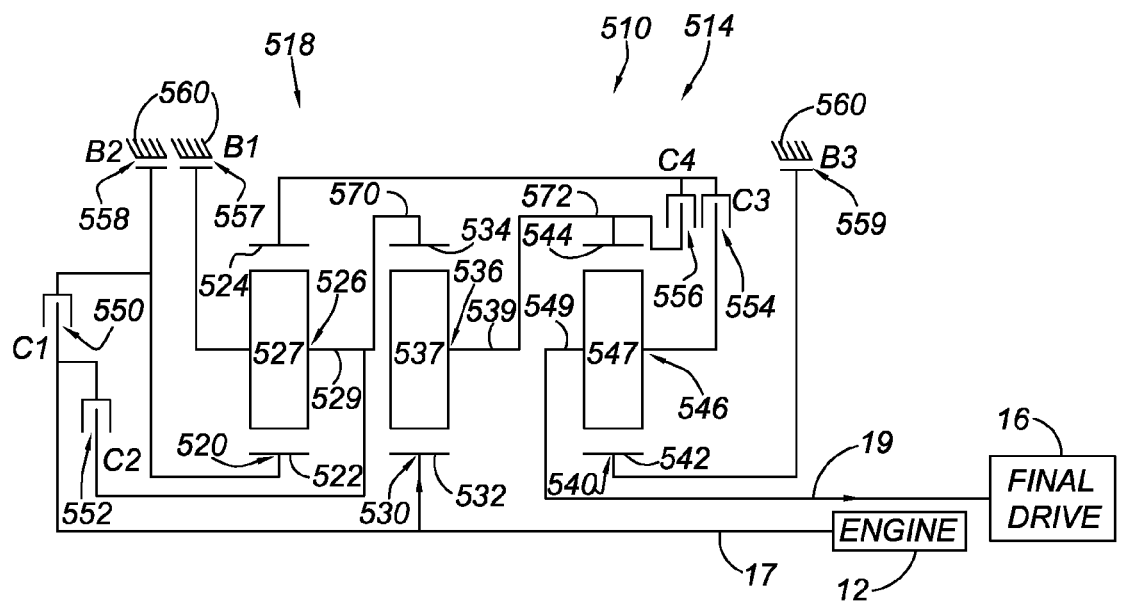

As set forth above, the truth table of FIG. 6b describes the engagement sequence of the torque-transmitting mechanisms utilized to provide one reverse drive ratio and at least seven forward speed ratios. The truth table also provides an example of the ratios that can be attained with the family members shown in FIG. 6a utilizing the sample tooth ratios given in FIG. 6b. The $N_{R1}/N_{S1}$ value is the tooth ratio of the planetary gear set 520; the $N_{R2}/N_{S2}$ value is the tooth ratio of the planetary gear set 530; and the $N_{R3}/N_{S3}$ value is the tooth ratio of the planetary gear set 540. Also shown in FIG. 6b are the ratio steps between single step ratios in the forward direction as well as the reverse to first ratio step ratio for 7-speed and 8-speed engagement schedules. For example, the first to second step ratio is 1.68.

Description of A Seventh Exemplary Embodiment

Figures 7A, 7B:
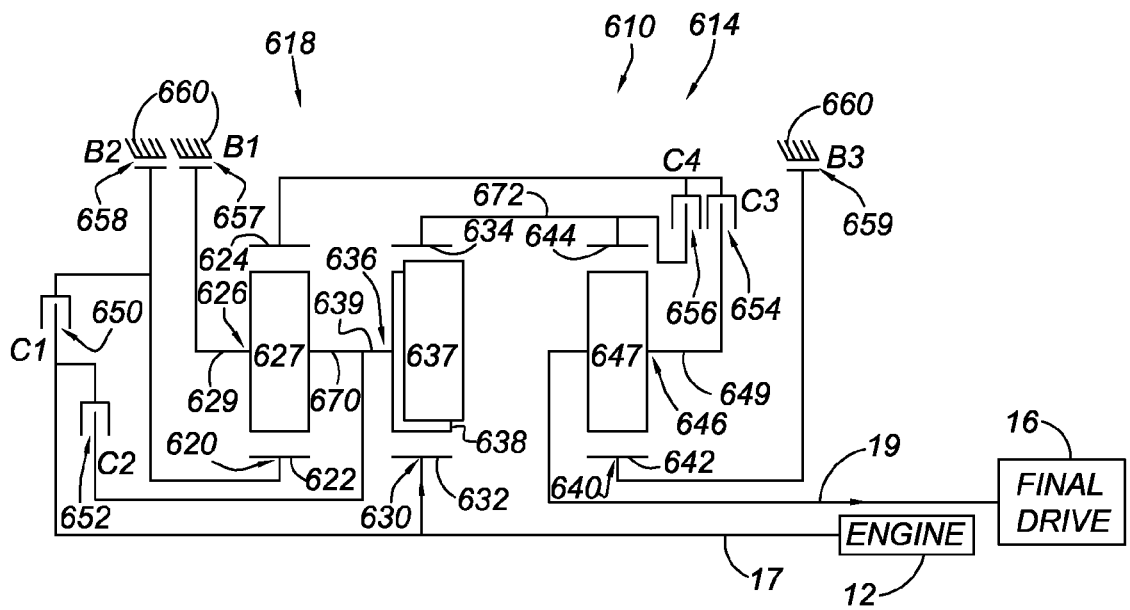

With reference to FIG. 7a, a powertrain 610 is shown, including a conventional engine and torque converter 12 connected to another embodiment of the planetary transmission, designated generally by the numeral 614, and a conventional final drive mechanism 16.

The planetary transmission 614 includes an input member 17 continuously connected with the engine 612, a planetary gear arrangement 618, and an output member 19 continuously connected with the final drive mechanism 16. The planetary gear arrangement 618 includes three planetary gear sets 620, 630 and 640.

The planetary gear set 620 includes a sun gear member 622, a ring gear member 624, and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637, 638 rotatably mounted on a carrier member 639. The pinion gears 637 are disposed in meshing relationship with the ring gear member 634. The pinion gears 638 are disposed in meshing relationship with both the sun gear member 634 and the respective pinion gear 637.

The planetary gear set 640 includes a sun gear member 642, a ring gear member 644, and a planet carrier assembly member 646. The planet carrier assembly member 646 includes a plurality of pinion gears 647 mounted on a carrier member 649 and disposed in meshing relationship with both the ring gear member 644 and the sun gear member 642.

The planetary gear arrangement also includes seven torque-transmitting mechanisms 650, 652, 654, 656, 657, 658 and 659. The torque-transmitting mechanisms 650, 652, 654 and 656 are rotating-type torque-transmitting mechanisms, commonly termed clutches. The torque-transmitting mechanisms 657, 658 and 659 are stationary-type torque-transmitting mechanisms, commonly termed brakes or reaction clutches.

The input member 17 is continuously connected to the sun gear member 632 of the planetary gear set 630. The output member 19 is continuously connected with the carrier member 646 of the planetary gear set 640. The first interconnecting member 670 continuously connects the carrier member 626 of the planetary gear set 620 with the carrier member 636 of the planetary gear set 630. A second interconnecting member 672 continuously connects the ring gear member 634 of the planetary gear set 630 with the ring gear member 644 of the planetary gear set 640.

A first torque transmitting device, such as clutch 650, selectively connects the sun gear member 622 of the planetary gear set 620 with the sun gear member 632 of the planetary gear set 630 which is continuously connected with the input member 17. A second torque transmitting device, such as clutch 652, selectively connects the with carrier member 626 of the planetary gear set 620 and the ring gear member 634 of the planetary gear set 630 via the first interconnecting member 670 the sun gear member 632 of the planetary gear set 630 which is continuously connected with the input member 17. A third torque transmitting device, such as clutch 654, selectively connects the ring gear member 624 of the planetary gear set 620 with the carrier member 646 of the planetary gear set 640 which is continuously connected with the output member 19. A fourth torque transmitting device, such as clutch 656, selectively connects the ring gear member 624 of the planetary gear set 620 with the ring gear member 644 of the planetary gear set 640. A fifth torque transmitting device, such as brake 657, selectively connects the carrier member 626 of the planetary gear set 620 and the carrier member 636 of the planetary gear set 630 via first interconnecting member 670 with the transmission housing 660. A sixth torque transmitting device, such as brake 658, selectively connects the sun gear member 622 of the planetary gear set 620 with the transmission housing 660. A seventh torque transmitting device, such as brake 659, selectively connects the sun gear member 642 of the planetary gear set 640 with the transmission housing 660.

As set forth above, the truth table of FIG. 7b describes the engagement sequence of the torque-transmitting mechanisms utilized to provide one reverse drive ratio and at least seven forward speed ratios. The truth table also provides an example of the ratios that can be attained with the family members shown in FIG. 7a utilizing the sample tooth ratios given in FIG. 7b. The $N_{R1}/N_{S1}$ value is the tooth ratio of the planetary gear set 620; the $N_{R2}/N_{S2}$ value is the tooth ratio of the planetary gear set 630; and the $N_{R3}/N_{S3}$ value is the tooth ratio of the planetary gear set 640. Also shown in FIG. 7b are the ratio steps between single step ratios in the forward direction as well as the reverse to first ratio step ratio for 7-speed and 8-speed engagement schedules. For example, the first to second step ratio is 1.53.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input member;
an output member;
first, second and third planetary gear sets each having first, second and third members;
said input member being continuously interconnected with at least one member of said planetary gear sets, and said output member being continuously interconnected with another member of said planetary gear sets;
a first interconnecting member continuously connecting said first member of said first planetary gear set with said first member of said second planetary gear set;
a second interconnecting member continuously connecting said second member of said second planetary gear set with said first member of said third planetary gear set;
a first torque-transmitting mechanism selectively connecting a member of said first planetary gear set with the member of said first, second or third planetary gear set which is continuously connected with said input member;
a second torque-transmitting mechanism selectively connecting said first interconnecting member with the member of said first, second or third planetary gear set which is continuously connected with said input member;
a third torque-transmitting mechanism selectively connecting a member of said first planetary gear set with the member of said first, second or third planetary gear set which is continuously connected with said output member;
a fourth torque-transmitting mechanism selectively connecting a member of said first planetary gear set with a member of said third planetary gear set or with said second interconnecting member;
a fifth torque-transmitting mechanism selectively connecting said first interconnecting member with a stationary member;
a sixth torque-transmitting mechanism selectively connecting a member of said first planetary gear set with said stationary member;
a seventh torque-transmitting mechanism selectively connecting a member of said third planetary gear set with said stationary member;
said torque-transmitting mechanisms being engaged in combinations of three to establish at least seven forward speed ratios and at least one reverse speed ratio between said input member and said output member.

2. The transmission defined in claim 1, wherein said first, second, third and fourth torque-transmitting mechanisms comprise clutches, and said fifth, sixth and seventh torque-transmitting mechanisms comprise brakes.

3. The transmission defined in claim 1, wherein at least one planet carrier assembly member of said planetary gear sets is a double-pinion carrier.

4. A multi-speed transmission comprising:
an input member;
an output member;
a planetary gear arrangement having first, second and third planetary gear sets, each planetary gear set having first, second and third members;
said input member being continuously interconnected with at least one member of said planetary gear sets, and said output member being continuously interconnected with another member of said planetary gear sets;
a first interconnecting member continuously connecting said first member of said first planetary gear set with said first member of said second planetary gear set;
a second interconnecting member continuously connecting said second member of said second planetary gear set with said first member of said third planetary gear set;
first, second, third, fourth, fifth, sixth and seventh torque-transmitting mechanisms each of which selectively interconnects one of said first interconnecting member and a respective one of said members of said planetary gear sets with one of a stationary member and another respective one of said members of said planetary gear sets, said torque-transmitting mechanisms being engaged in combinations of three to establish at least seven forward speed ratios and at least one reverse speed ratio between said input member and said output member; and
wherein said fifth torque-transmitting mechanism selectively connects said first interconnecting member with said stationary member.

5. The transmission defined in claim 4:
wherein the first, second and third planetary gear sets include at least one planet carrier assembly member; and
wherein said at least one planet carrier assembly member of said planetary gear sets is a double-pinion carrier.

6. The transmission defined in claim 4, wherein said first torque-transmitting mechanism selectively connects one of said members of said first planetary gear set with the member of said first, second or third planetary gear set which is continuously connected with said input member.

7. The transmission defined in claim 6, wherein said second torque-transmitting mechanism selectively connects said first interconnecting member with the member of said first, second or third planetary gear set which is continuously connected with said input member.

8. The transmission defined in claim 7, wherein said third torque-transmitting mechanism selectively connects one of said members of said first planetary gear set with the member of said first, second or third planetary gear set which is continuously connected with said output member.

9. The transmission defined in claim 8, wherein said fourth torque-transmitting mechanism selectively connects one of said members of said first planetary gear set with another of said members of said third planetary gear set or with said second interconnecting member.

10. The transmission defined in claim 9, wherein said sixth torque-transmitting mechanism selectively connects one of said members of said first planetary gear set with said stationary member.

11. The transmission defined in claim 10, wherein said seventh torque-transmitting mechanism selectively connects one of said members of said third planetary gear set with said stationary member.

12. A multi-speed transmission comprising:
an input member;
an output member;
a planetary gear arrangement having first, second and third planetary gear sets, each planetary gear set having first, second and third members;
said input member being continuously interconnected with at least one member of said planetary gear sets, and said output member being continuously interconnected with another of said members of said planetary gear sets;
a first interconnecting member continuously connecting said first member of said first planetary gear set with said first member of said second planetary gear set;
a second interconnecting member continuously connecting said second member of said second planetary gear set with said first member of said third planetary gear set;
first, second, third, fourth, fifth, sixth and seventh torque-transmitting mechanisms each of which selectively interconnects one of said first interconnecting member and a respective one of said members of said planetary gear sets with one of a stationary member and another respective one of said members of said planetary gear sets, said torque-transmitting mechanisms being engaged in combinations of three to establish at least seven forward speed ratios and at least one reverse speed ratio between said input member and said output member; and
wherein one of said torque-transmitting mechanisms selectively connects said first interconnecting member with the member of said first, second or third planetary gear set which is continuously connected with said input member.

* * * * *